United States Patent
Zhang et al.

(10) Patent No.: US 9,751,529 B2
(45) Date of Patent: Sep. 5, 2017

(54) LANE SENSING THROUGH LANE MARKER IDENTIFICATION FOR LANE CENTERING/KEEPING

(75) Inventors: Wende Zhang, Troy, MI (US); Bakhtiar Brian Litkouhi, Washington, MI (US); Jin-Woo Lee, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1384 days.

(21) Appl. No.: 13/156,974

(22) Filed: Jun. 9, 2011

(65) Prior Publication Data

US 2012/0316730 A1    Dec. 13, 2012

(51) Int. Cl.
| | |
|---|---|
| *B62D 6/00* | (2006.01) |
| *B60W 30/12* | (2006.01) |
| *B62D 15/02* | (2006.01) |
| *B60W 10/20* | (2006.01) |
| *B60W 40/06* | (2012.01) |

(52) U.S. Cl.
CPC .......... *B60W 30/12* (2013.01); *B60W 10/20* (2013.01); *B60W 40/06* (2013.01); *B60W 2420/42* (2013.01); *B60W 2710/202* (2013.01); *B60W 2710/207* (2013.01); *B60W 2720/14* (2013.01)

(58) Field of Classification Search
CPC .......... B62D 6/00; B62D 15/02; B60W 30/12
USPC ......... 701/29, 41, 300, 93, 96, 301; 382/104
See application file for complete search history.

(56) References Cited

U.S. PATENT DOCUMENTS

| | | | | | |
|---|---|---|---|---|---|
| 5,517,412 | A | * | 5/1996 | Unoura | 701/23 |
| 5,850,254 | A | * | 12/1998 | Takano et al. | 348/148 |
| 7,265,657 | B2 | * | 9/2007 | Nishida et al. | 340/436 |
| 2003/0103650 | A1 | * | 6/2003 | Otsuka et al. | 382/104 |
| 2007/0276599 | A1 | * | 11/2007 | Ogawa | 701/300 |
| 2008/0186154 | A1 | | 8/2008 | Haug | |
| 2008/0195280 | A1 | * | 8/2008 | Deng et al. | 701/41 |
| 2010/0014714 | A1 | | 1/2010 | Zhang | |
| 2011/0164789 | A1 | * | 7/2011 | Robert | 382/104 |
| 2011/0231063 | A1 | * | 9/2011 | Kim | 701/41 |
| 2011/0257826 | A1 | * | 10/2011 | Yu et al. | 701/29 |

FOREIGN PATENT DOCUMENTS

| | | |
|---|---|---|
| CN | 101727756 A | 6/2010 |
| DE | 102005049071 A1 | 4/2007 |

\* cited by examiner

*Primary Examiner* — Yonel Beaulieu
*Assistant Examiner* — Martin Weeks
(74) *Attorney, Agent, or Firm* — John A. Miller; Miller IP Group, PLC

(57) ABSTRACT

A method for adjusting a vehicle's position in a roadway lane. A camera mounted on the vehicle generates a current image of the lane and the method identifies a current lane-center line in the current image. A reference image is generated and the method identifies a reference lane-center line in the reference image. The method then calculates an error between the current lane-center line and the reference lane-center line and provide steering commands to adjust the position of the vehicle so that the error is reduced.

18 Claims, 3 Drawing Sheets

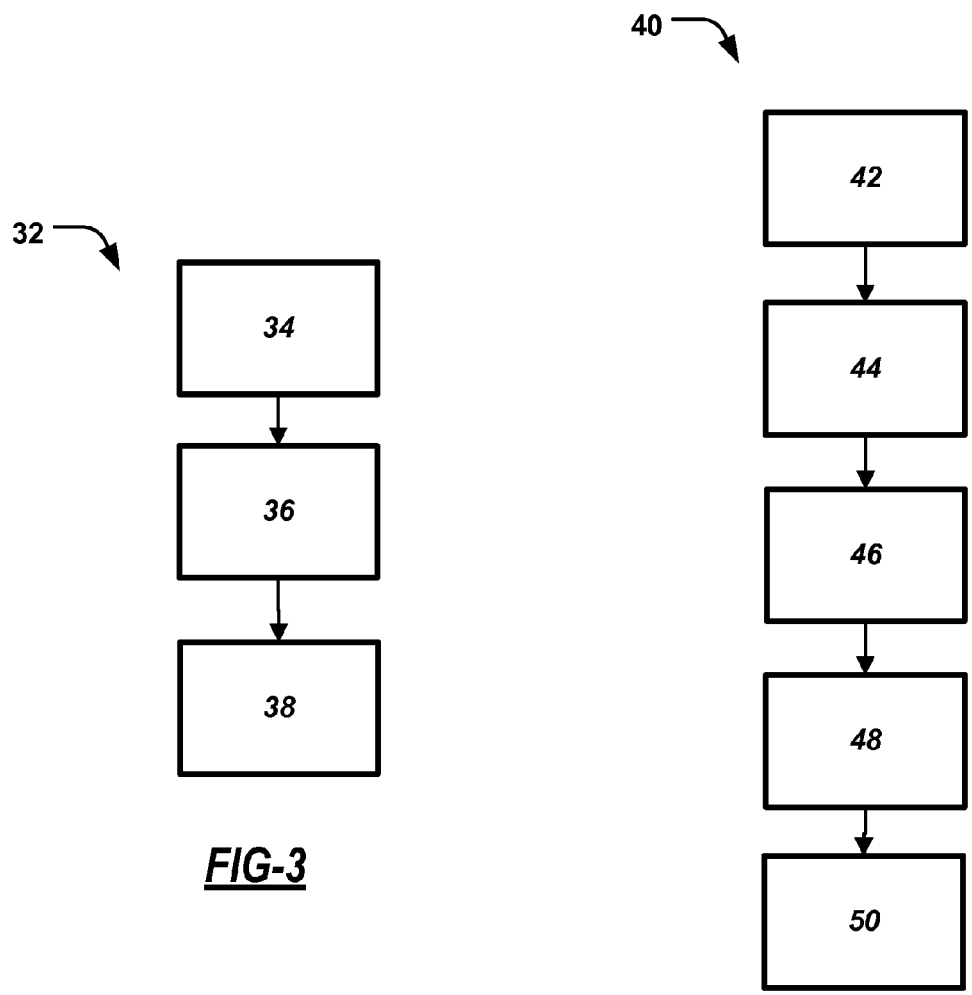

LANE SENSING THROUGH LANE MARKER IDENTIFICATION FOR LANE CENTERING/KEEPING

BACKGROUND OF THE INVENTION

1. Field of the Invention

This invention relates generally to a system and method for detecting the position of a vehicle in a roadway lane and centering the vehicle in the lane and, more particularly, to a system and method for detecting the position of a vehicle in a roadway lane and centering the vehicle in the lane by identifying lane markers from a video sequence of the lane and providing steering control for lane centering.

2. Discussion of the Related Art

The operation of modern vehicles is becoming more autonomous, i.e., vehicles are able to provide driving control with less driver intervention. Cruise control systems have been on vehicles for a number of years where the vehicle operator can set a particular speed of the vehicle, and the vehicle will maintain that speed without the driver operating the throttle. Adaptive cruise control systems have been recently developed in the art where not only does the system maintain the set speed, but also will automatically slow the vehicle down in the event that a slower moving vehicle is detected in front of the subject vehicle using various sensors, such as radar, lidar and cameras. Modern vehicle control systems may also include autonomous parking where the vehicle will automatically provide the steering control for parking the vehicle, and where the control system will intervene if the driver makes harsh steering changes that may affect vehicle stability and lane centering capabilities, where the vehicle system attempts to maintain the vehicle near the center of the lane. Fully autonomous vehicles have been demonstrated that drive in simulated urban traffic up to 30 mph, while observing all of the rules of the road.

As vehicle systems improve, they will become more autonomous with the goal being a completely autonomously driven vehicle. Future vehicles will likely employ autonomous systems for lane changing, passing, turns away from traffic, turns into traffic, etc. As these systems become more prevalent in vehicle technology, it will also be necessary to determine what the driver's role will be in combination with these systems for controlling vehicle speed, steering and overriding the autonomous system.

Examples of semi-autonomous vehicle control systems include U.S. patent application Ser. No. 12/399,317 (herein referred to as '317), filed Mar. 6, 2009, titled "Model Based Predictive Control for Automated Lane centering/changing control systems," assigned to the assignee of this application and herein incorporated by reference, which discloses a system and method for providing steering angle control for lane centering and lane changing purposes in an autonomous or semi-autonomous vehicle. U.S. patent application Ser. No. 12/336,819, filed Dec. 17, 2008, titled "Detection of Driver Intervention During a Torque Overlay Operation in an Electric Power Steering System," assigned to the assignee of this application and herein incorporated by reference, discloses a system and method for controlling vehicle steering by detecting a driver intervention in a torque overly operation.

Modern lane centering/keeping systems typically use vision systems to sense a lane and drive the vehicle in the center of the lane. One method that enables the use of vision systems requires calibrating the camera and correlating the length/distance on the images from the camera with the corresponding length/distance in the real world. To know the relationship between the image and the real world coordinates requires calibration of the vision system to the real world. The calibration is necessary because of a number of distortions including those caused by the camera lens, variations in the mounting position and variations in the mounting direction of the camera. With a calibrated camera, information about the length/distance in the image is translated into a length/distance in the real world and that information is given to an autonomous steering module to calculate steering commands to steer the vehicle to the center of the lane. However, this calibration and translation between image size and real world length/distance is labor and computationally intensive.

A need exists for a lane centering system and method that does not require camera calibration and translation and can still allow accurate centering of the vehicle in the lane.

SUMMARY OF THE INVENTION

In accordance with the teachings of the present invention, a method for adjusting a vehicle's position in a roadway lane is disclosed. A camera mounted on the vehicle generates a current image of the lane and the method identifies a current lane-center line on the current image. A reference image is generated and the method identifies a reference lane-center line on the reference image. The method then calculates an error between the current lane-center line and the reference lane-center line and provides steering commands to adjust the position of the vehicle so that the error is reduced.

Additional features of the present invention will become apparent from the following description and appended claims, taken in conjunction with the accompanying drawings.

BRIEF DESCRIPTION OF THE DRAWINGS

FIG. 3 is an exemplary flow chart diagram that the lane centering system can use to set reference lane-center parameters;

FIG. 4 is an exemplary flow chart diagram for use by the lane centering system to provide a control loop that steers the vehicle to a preferred reference position in the lane.

DETAILED DESCRIPTION OF THE EMBODIMENTS

The following discussion of the embodiments of the invention directed to a method and system for providing vehicle lane centering using lane marker identification is merely exemplary in nature, and is in no way intended to limit the invention or its applications or uses.

The present invention proposes a system and method for providing vehicle lane centering and keeping by utilizing images from a vehicle-mounted camera that senses the vehicle travel-lane through lane marker identification and then uses that information for lane-centering as the vehicle travels along the road. The system includes at least one vehicle-mounted camera that takes images of the lane. The system designates an image from the camera as a reference image, where the reference image depicts the view of the lane when the vehicle is in a desired reference location within the lane. The system determines a reference lane-center line from the reference image that identifies the center of the lane on the image. The system receives a current image from the camera, and calculates a current lane-center line in the current image. The system compares the reference lane-center line and the current lane-center line, and calculates and sends steering adjustments to position the vehicle so that the current lane-center line matches the reference lane-center line to steer the vehicle into the preferred position within the lane. This eliminates the need to calibrate the camera to the real world, and thus simplifies the computational requirements. Actual knowledge of the geometric lane-center is unnecessary in that any lane image from the vehicle-mounted camera identified as the reference image can form the basis of the reference lane-center.

Figure 1:
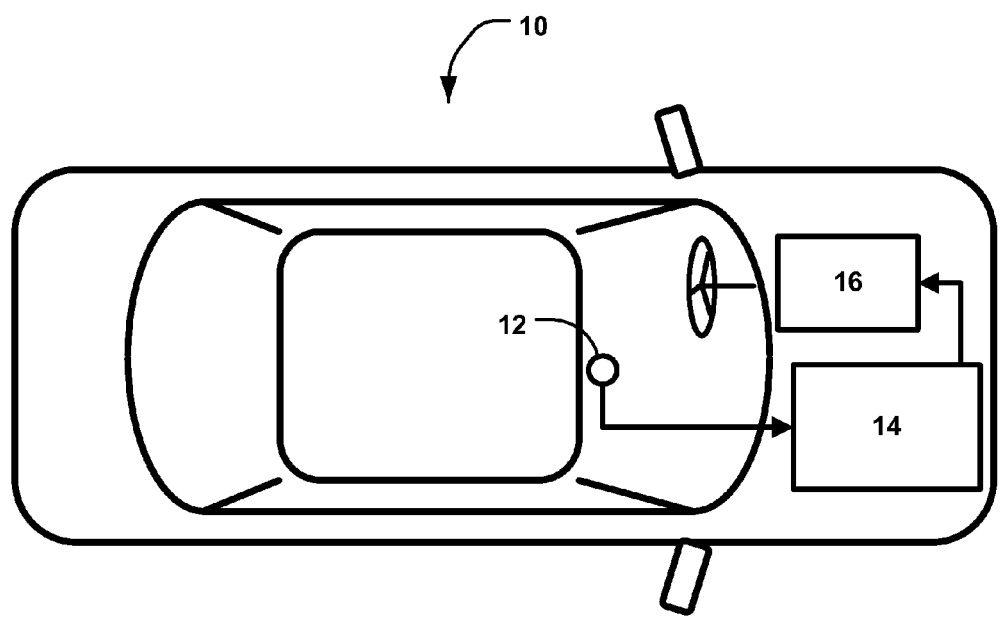
FIG. 1 is a diagram of a vehicle including a lane centering system for centering the vehicle in a roadway lane that the vehicle is traveling.

FIG. 1 is a diagram of a vehicle 10 including a lane centering system 14 for centering the vehicle 10 in a roadway lane that the vehicle 10 is traveling. The vehicle 10 includes a camera 12 mounted on the vehicle 10 that provides images of the lane to the lane centering system 14. In other embodiments, the vehicle 10 may employ multiple cameras including rearward facing cameras, all of which provide images to the lane centering system 14. The lane centering system 14 processes a current image from the camera 12 to identify a current lane-center line and compares it to a reference lane-center line. The lane centering system 14 commands a steering system 16 with steering angle signals to position the vehicle 10 in the lane so that the current lane-center line matches the reference lane-center line.

There are many positions that the reference lane-center line can represent. The reference lane-center line can be the center of the lane (the actual geometric lane-center), an offset/bias from the geometric lane-center, or an offset/bias from any other lane feature, such as a lane boundary. For example, the driver might prefer to have the vehicle 10 offset from the lane centerline or from the left lane marker.

The lane centering system 14 can derive the reference lane-center line from a reference image or a set of reference images representing the geometric center of the lane. There are at least three different sources of reference image/images that can represent the geometric center of the lane. For example, in one embodiment an image is provided when the vehicle was in the geometric center of the lane. In another embodiment, multiple images are provided when the vehicle was in the geometric center of the lane. In a third embodiment, images are identified by machine learning techniques as images taken when the vehicle was in the geometric center of the lane.

The lane centering system 14 can derive the reference lane-center line from a reference image or a set of reference images representing the geometric center of the lane plus a bias. There are at least four additional sources of reference image/images that can represent the geometric center of the lane plus a bias. For example, in one embodiment, an image is provided when the vehicle was in the geometric center of the lane plus a bias. In another embodiment, multiple images are provided when the vehicle was in the geometric center of the lane plus some bias. In another embodiment, images are identified by machine learning techniques of a driver's preferred bias (habitual offset) from the geometric center of the lane. In fourth embodiment, images represent an average or typical driver's preference.

The lane centering system 14 can also base the reference lane-center line on a series of lane-center parameters. The lane-center parameters are derived from a series of images and the images can be taken over a period-of-time or when the vehicle 10 is in a preferred lane position (as indicated by some other system or the driver).

The lane centering system 14 can also base the reference lane-center line on an ideal lane centerline derived through machine learning techniques. The lane centering system 14 can derive the reference lane-center line through machine learning techniques that the driver prefers in different situations. The preferred lane center for the vehicle 10 can be correlated as to how the driver drove when in a similar situation retrieved from driver history. For example, some drivers may prefer to be 10 to 50 cm offset from the lane-center due to habit or because of roadside objects (i.e., guard rails, trucks) in the adjacent lane. For example, if there is a vehicle on the right side of the road, say a police car, then the reference lane-center line can be offset significantly to the left side.

A lane-center line (the reference lane-center line or the current lane-center line) can be defined by any number of parameter sets that mathematically represent a line. One set of parameters to mathematically define the lane-center line is an angle $\phi$ of the line, and a distance y that is measured at the bottom edge line of the image from the bottom left corner to where the lane-center line intersects the bottom edge line. This would be mathematically equivalent to measuring the distance y from any other location on the bottom edge line. Other sets of parameters are available to mathematical define the lane-center line that lack an angle.

Figure 2:
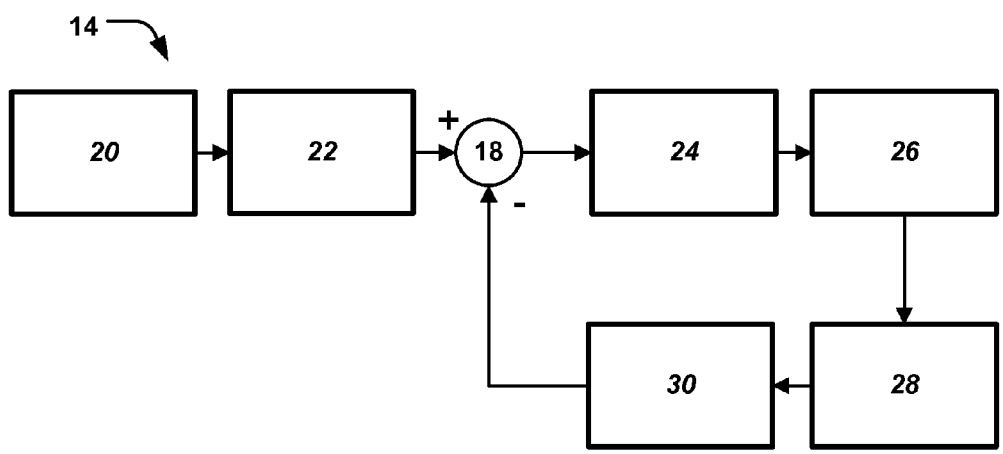
FIG. 2 is a block diagram of the lane-centering system.

FIG. 2 is a block diagram of the lane-centering system 14 that shows one possible, but non-limiting, implementation. The system 14 includes a preference processor 20 that identifies and stores in a database the reference image/images discussed above. The desired reference image/images are provided to a reference image processor 22 that determines the reference lane-center line in any suitable manner, which will be discussed in more detail below. The reference lane-center line that includes any offset is provided to a comparator 18 that compares the reference lane-center line to the current lane-center line determined from a current image provided by the camera 12. The difference or error between the reference lane-center line and the current lane-center line is provided to a lane-centering controller 24 that calculates a steering command angle signal $\delta$ to reduce or minimize the error between the reference lane-center line and the current lane-center line. In one non-limiting embodiment the lane-centering controller 24 determines the steering angle command signal $\delta$ by minimizing a cost function, where various cost functions are possible (depending on the lane centering design concept) with one example being cost function J discussed in more detail in equation (1) below. The steering angle command signal $\delta$ is provided to a steering system 26, representing the steering system 16, to cause the vehicle 10 to steer towards the desired lane position and reduce the error between the reference lane-center line and the current lane-center line. As the vehicle 10 is steered towards the desired lane position, a lane detection device 28, such as the camera 12, detects and images the changing lane markers. The images are provided to a current image processor 30 that determines the new current lane-center line that is then provided to the comparator 18 to be compared with the reference lane-center line to continue to reduce the error between the reference lane-center line and the current lane-center line.

FIG. 3 is an exemplary flow chart diagram 32 showing a process that the lane centering system 14 can use to determine the reference lane-center parameters for determining the reference lane-center line. The process starts when box 34 receives the reference image/images in the preference processor 20 that are identified as the reference image/images and stores the reference image/images in a database. Particularly, as discussed above, the reference image or images can be identified as an image when the vehicle was in the geometric center of the lane plus some bias, images are identified by machine learning techniques from a driver's preferred bias from the geometric center of the lane, or images represent an average or typical driver's preference. Next, the reference image processor 22 retrieves the reference image/images from the database and determines the reference lane-center parameters at box 36, discussed in more detail below. The process provides the reference lane-center parameters to the lane-centering controller 24 at box 38.

FIG. 4 is an exemplary flow chart diagram 40 showing a process used by the lane centering system 14, and specifically the controller 26, to provide a control loop that steers the vehicle 10 to the preferred reference position. The process receives a current lane image generated by the camera 12 at box 42. The current image is processed at box 44 to determine the current lane-center parameters. The process then retrieves the reference lane-center parameters at box 46. Next, the process compares the current and reference lane-center parameters at box 48 to calculate the steering angle command δ to minimize the error between the reference lane-center parameters and the current lane-center parameters. The process sends the steering angle command δ to the steering system 16 at box 50. The process repeats starting with box 42 again when a next current lane Image is received.

The lane centering system 14 directs the vehicle 10, with steering adjustments, to the location that zeros out the difference between the current lane-center parameters and the reference lane-center parameters. The lane centering system 14 can calculate steering adjustments in any number of suitable ways. One example for providing a series of steering adjustments is discussed in the '317 application, which provides steering commands that reduces a cost function J defined as:

$$J = \int_0^{\Delta T} \left\{ [y_L \ \varphi]_{err} \cdot Q(x) \cdot \begin{bmatrix} y_L \\ \varphi \end{bmatrix}_{err} + \delta \cdot R(t) \cdot \delta \right\} dt \quad (1)$$

Where $y_{L,err}$ is an offset error ($y_{L,ref} - y_{L,current}$), $\varphi_{err}$ is a heading angle error ($\varphi_{ref} - \varphi_{current}$), $y_{L,ref}$ and $\varphi_{ref}$ are the reference lane-center parameters, and $y_{L,current}$ and $\varphi_{current}$ are the current lane-center parameters, Q(t) and R(t) are weighting factors, and δ is a steering angle command.

Alternatively, the steering angle commands δ can be replaced with a steering torque τ or a yaw moment M to minimize the cost function J, which will depend on the steering system configuration. For example, certain steering actuators may only accept a steering torque τ command and not a steering angle command δ. Further, certain lane centering systems may be actuated by a differential braking mechanism combined with a steering actuator, which may require the yaw moment M.

Figure 5:
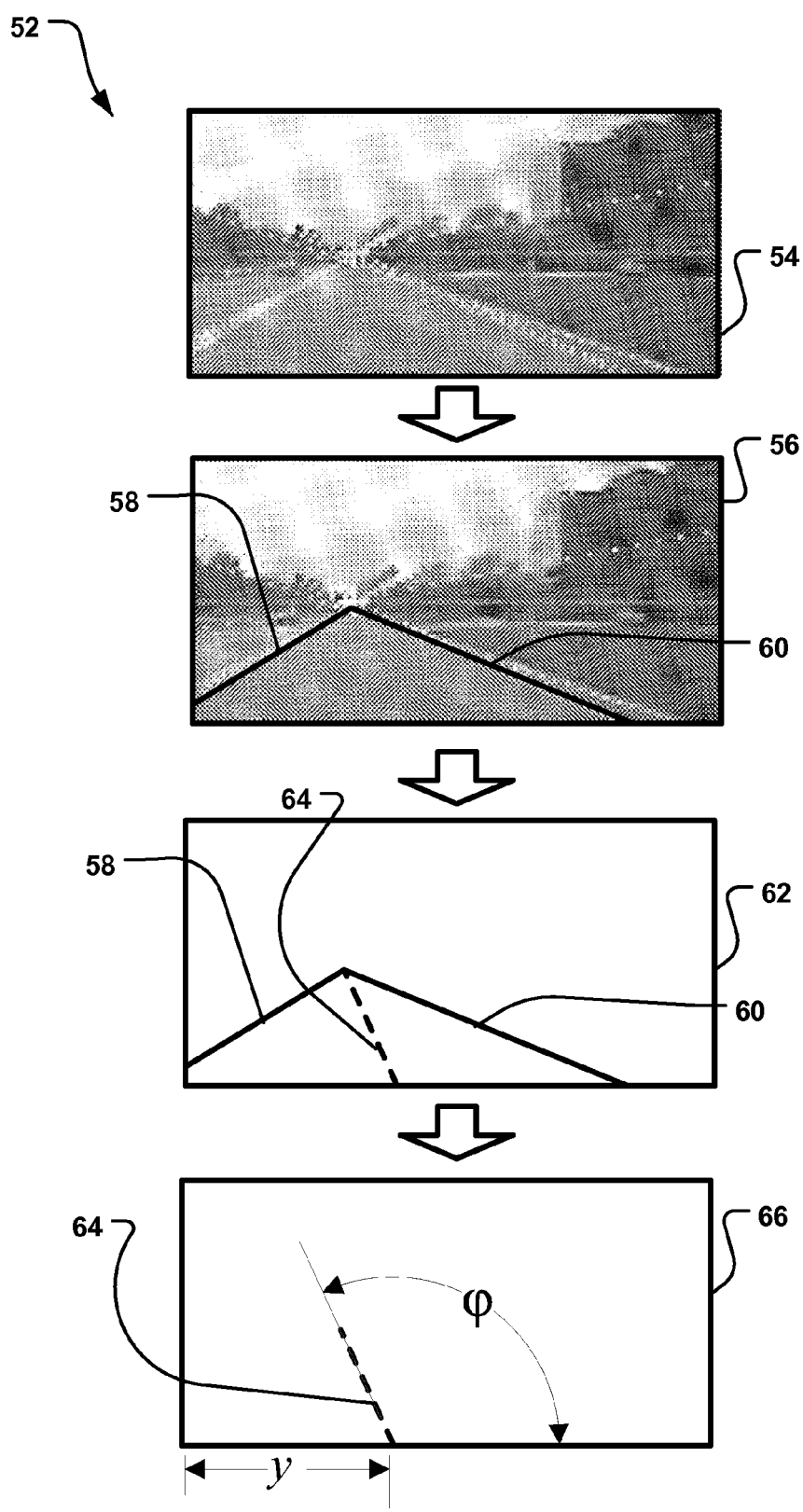
FIG. 5 is a series of images that show how the lane centering system identifies lane-center parameters.

FIG. 5 illustrates through a series of images 52 how the lane centering system 14 identifies lane-center parameters. Image 54 is the image that the lane centering system 14 receives from the camera 12. The lane centering system 14 processes the image 54 using camera-based lane marker detection techniques to identify lane markers and lane boundaries, such as a left lane-boundary 58 and a right lane-boundary 60, as shown in image 56. Patent application Ser. No. 12/175,631, filed Mar. 6, 2009, titled "Camera-Based Lane Marker Detection," assigned to the assignee of this application and herein incorporated by reference, discloses an exemplary system for this purpose. The lane centering system 14 uses the left lane-boundary 58 and the right lane-boundary 60 to calculate a lane-center line 64 as shown in image 62. The lane centering system 14 calculates the lane-center parameters, where φ is the angle of the lane-center line 64 and y is the location where the lane-center line 64 intersects the bottom edge-line of an image 66. The edge-line is the edge of the image 66 where the edge properly handles the situation where the lane-center line 64 crosses a side-edge of the image 66 before it reaches the bottom-edge.

The lane centering system 14 can base the lane-center on any number of calculations. For example, the lane centering system 14 can calculate the lane-center line 64 by constructing a line at the average between the left lane-boundary 58 and the right lane-boundary 60. This method of arriving at the lane-center line has the advantage of ameliorating any distortion or curves in the lane boundaries.

The lane centering system 14 uses the process depicted in the series of images 52 to extract lane-center parameters from the reference image and the current image. Box 36 uses the process depicted in the series of images 52 to identify the reference lane-center parameter. Box 44 uses the process shown in the series of images 52 to identify the current lane-center parameters.

It is to be understood that the above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that further developments will occur in the arts discussed herein, and that the disclosed systems and methods will be incorporated into such further examples. In sum, it should be understood that the invention is capable of modification and variation and is limited only by the following claims.

The present embodiments have been particular shown and described, which are merely illustrative of the best modes. It should be understood by those skilled in the art that various alternatives to the embodiments described herein may be employed in practicing the claims without departing from the spirit and scope of the invention and that the method and system within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable construction and their ordinary meaning as understood by those skilled in the art unless an explicit indication to the contrary is made herein. In particular, use of the singular articles such as "a", "the", "said", etc. should be read to recite one or more of the indicated elements unless a claim recites an explicit limitation to the contrary.

What is claimed is:

1. A method for correcting a position of a vehicle in a roadway lane, said method comprising:

generating a reference image of the roadway lane using a camera mounted on the vehicle, where the reference image is a two-dimensional image;

identifying a reference lane-center line on the two-dimensional reference image;

generating a current image of the lane using the camera, where the current image is a two-dimensional image;

identifying a current lane-center line on the two-dimensional current image;

calculating an error between the current lane-center line and the reference lane-center line; and adjusting the position of the vehicle with a controller so that the error is reduced, wherein identifying the current lane center line and the reference lane-center line includes identifying the current lane-center line and the reference lane-center line by lane-center parameters including an angle of the lane-center line and a location where the lane-center line touches an edge line of the image.

2. The method of claim 1 wherein adjusting the position of the vehicle includes providing a steering adjustment command signal to a vehicle steering system.

3. The method of claim 1 wherein identifying the current lane-center line includes using camera-based lane marker detection to identify a left lane-boundary and a right lane-boundary in the current image, and then averaging the left and right lane-boundaries to identify the lane-center line.

4. The method of claim 1 wherein generating the reference image includes generating the reference image when the vehicle is in a geometric center of the lane or the geometric center of the lane plus a bias.

5. The method of claim 1 wherein generating the reference image includes identifying the reference image by machine learning techniques that are based on a driver's preferred bias.

6. The method of claim 1 further comprising determining a desired driver offset relative to a center line in the roadway lane, and modifying the reference lane-center line based on the offset.

7. The method of claim 1 wherein adjusting the position of the vehicle includes generating a sequence of steering angle commands that minimizes a cost function J as:

$$J = \int_0^{\Delta T} \left\{ [y_L \; \varphi]_{err} \cdot Q(x) \cdot \begin{bmatrix} y_L \\ \varphi \end{bmatrix}_{err} + \delta \cdot R(t) \cdot \delta \right\} dt$$

where $y_{L,err}$ is an offset error ($y_{L,ref} - y_{L,current}$), $\varphi_{err}$ is a heading angle error ($\varphi_{ref} - \varphi_{current}$), $y_{L,ref}$ and $\varphi_{ref}$ are the reference lane-center parameters, and $y_{L,current}$ and $\varphi_{current}$ are the current lane-center parameters, Q(t) and R(t) are weighting factors, and $\delta$ is a steering command angle.

8. The method of claim 7 wherein adjusting the position of the vehicle includes generating a sequence of steering torques or yaw moments instead of steering angle commands to minimize the cost function J.

9. A lane centering system for centering a vehicle in a roadway lane that the vehicle is traveling in, said system comprising:

a camera that generates images of the roadway lane, where the images are two-dimensional images;

a reference image processor that identifies a reference lane-center line on a two-dimensional reference image selected from the camera that is identified as an image when the vehicle was in a geometric center of the lane plus a predetermined bias using machine learning techniques;

a current image processor that identifies a current lane-center line on a two-dimensional current image from the camera;

a comparator that compares the reference lane-center line and the current lane-center line and provides an error therebetween; and a lane-centering controller that receives the error and calculates a steering command that centers the vehicle in the lane by reducing the error.

10. The centering system of claim 9 further comprising a vehicle steering system, said vehicle steering system receiving the steering command from the lane-centering controller to steer the vehicle in the lane.

11. The centering system of claim 9 wherein the reference image processor and the current image processor identify the current lane-center line and the reference lane-center line by lane-center parameters that include an angle of the lane-center line and a location that the lane-center line touches an edge line of the image.

12. The centering system of claim 9 wherein the reference image processor and the current image processor use camera-based lane marker detection to identify a left lane-boundary and a right lane-boundary in the reference image and the current image, and then average the left and right lane-boundaries to identify the lane-center line.

13. The centering system of claim 9 wherein the reference image processor selects the reference image from the camera when the vehicle is in a geometric center of the lane or the geometric center of the lane plus a bias.

14. The centering system of claim 9 wherein the reference image processor selects the reference image from the camera by machine learning techniques when the vehicle is in a geometric center of the lane.

15. The centering system of claim 9 wherein the reference image processor selects the reference image from the camera by machine learning techniques that are for the same driver representing that driver's preferred bias.

16. The centering system of claim 9 further comprising a preference processor that determines a desired driver offset relative to a center of the lane, said preference processor providing the driver offset to the reference image processor.

17. The centering system of claim 16 wherein the preference processor generates the reference image when the vehicle is in a preferred reference location within the lane.

18. A method for correcting a position of a vehicle in a roadway lane, said method comprising:

generating a reference image of the roadway lane using a camera mounted on the vehicle, where the reference image is a two-dimensional image;

identifying a reference lane-center line on the two-dimensional reference image;

generating a current image of the lane using the camera, where the current image is a two-dimensional image;

identifying a current lane-center line on the two-dimensional current image;

calculating an error between the current lane-center line and the reference lane-center line; and adjusting the position of the vehicle with a controller so that the error is reduced, wherein generating the reference image includes identifying the reference image by machine learning techniques when the vehicle is in a geometric center of the lane.

* * * * *